United States Patent
Riverin (10) Patent No.: US 11,702,939 B2
(45) Date of Patent: Jul. 18, 2023

(54) FAN ICING DETECTION SYSTEM

(71) Applicant: PRATT & WHITNEY CANADA CORP., Longueuil (CA)

(72) Inventor: Guy Riverin, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/383,695

(22) Filed: Jul. 23, 2021

(65) Prior Publication Data
US 2023/0024239 A1    Jan. 26, 2023

(51) Int. Cl.
*F01D 5/02* (2006.01)
*F02K 3/06* (2006.01)
*F02C 7/04* (2006.01)

(52) U.S. Cl.
CPC ............... *F01D 5/027* (2013.01); *F02C 7/04* (2013.01); *F02K 3/06* (2013.01); *F05D 2220/36* (2013.01); *F05D 2260/15* (2013.01); *F05D 2260/96* (2013.01)

(58) Field of Classification Search
CPC .. F01D 5/027; F05D 2220/36; F05D 2260/15; F05D 2260/96; F03D 80/40
See application file for complete search history.

(56) References Cited

U.S. PATENT DOCUMENTS 5,005,015 A     4/1991  Dehn et al.
6,733,240 B2 *  5/2004  Gliebe ............... F04D 29/324
                                              416/228
8,308,435 B2 *  11/2012 Storace ............... G01M 15/14
                                              73/470

(Continued)

FOREIGN PATENT DOCUMENTS

EP    3460186 A1    3/2019
EP    3572642 A1   11/2019

(Continued)

OTHER PUBLICATIONS

Culley, Dennis & Behbahani, Alireza. (2008). Communication Needs Assessment for Distributed Turbine Engine Control (Postprint). 16. 10.2514/6.2008-5281 (Year: 2008).*

(Continued)

*Primary Examiner* — Christopher R Legendre
(74) *Attorney, Agent, or Firm* — Norton Rose Fulbright Canada LLP.

(57) ABSTRACT

A turbofan engine has a fan drivingly engaged by a shaft for rotation about a rotation axis and having: fan blades circumferentially distributed about the rotation axis and drivingly engaged by the shaft; an ice-accruing feature located on a surface of the fan exposed to an air flow flowing between the fan blades, the ice-accruing feature having a shape providing a non-axisymmetric ice accumulation on the fan to create a rotational imbalance; a balancing feature secured to the fan or to the shaft to counteract the ice-accruing feature such that the fan is rotationally balanced when the fan is free of ice, the balancing feature being located such as to be outside the air flow; an aircraft controller; and a sensor operatively connected to the fan and operable to send a signal to the aircraft controller, the signal indicative of the rotational imbalance caused by the ice-accruing feature.

16 Claims, 6 Drawing Sheets

(56) References Cited

U.S. PATENT DOCUMENTS

| | | | |
|---|---|---|---|
| 10,822,999 B2 | 11/2020 | Morris et al. | |
| 10,968,827 B2 * | 4/2021 | Alecu | F02C 7/047 |
| 2020/0308980 A1 | 10/2020 | Raykowski | |
| 2023/0024239 A1 * | 1/2023 | Riverin | F01D 5/027 |

FOREIGN PATENT DOCUMENTS

| | | | |
|---|---|---|---|
| EP | 3680457 A1 | 7/2020 | |
| GB | 1550824 A | 8/1979 | |

OTHER PUBLICATIONS

European Search Report issued in counterpart application No. EP22185814.5 dated Dec. 23, 2022.

* cited by examiner

FAN ICING DETECTION SYSTEM

TECHNICAL FIELD

The application relates generally to gas turbine engines and, more particularly, to systems and methods used to detect ice on fan blades of turbofan gas turbine engines.

BACKGROUND OF THE ART

Ice can form and adhere to the fan blades of a gas turbine engine under certain conditions during flight. The weight of the ice buildup can result in imbalance of the fan and can be detrimental to efficient air flow. When ice breaks away and is released, the fan can be imbalanced, orbiting increases, vibration occurs and impact from ice particles can cause foreign object damage.

SUMMARY

In one aspect, there is provided a turbofan engine comprising a fan drivingly engaged by a shaft for rotation about a rotation axis and having: fan blades circumferentially distributed about the rotation axis and drivingly engaged by the shaft; an ice-accruing feature located on a surface of the fan exposed to an air flow flowing between the fan blades, the ice-accruing feature having a shape providing a non-axisymmetric ice accumulation on the fan to create a rotational imbalance; a balancing feature secured to the fan or to the shaft to counteract the ice-accruing feature such that the fan is rotationally balanced when the fan is free of ice, the balancing feature being located such as to be outside the air flow; an aircraft controller; and a sensor operatively connected to the fan and operable to send a signal to the aircraft controller, the signal indicative of the rotational imbalance caused by the ice-accruing feature.

The turbofan engine described above may include any of the following features, in any combinations.

In some embodiments, the ice-accruing feature includes a tab secured to an airfoil of a fan blade of the fan blades.

In some embodiments, the tab is protruding from a trailing edge of the airfoil.

In some embodiments, the tab is located proximate a tip of the airfoil.

In some embodiments, the ice-accruing feature includes a dimple defined by an airfoil of a fan blade of the fan blades.

In some embodiments, the dimple is located at or proximate to a trailing edge of the airfoil.

In some embodiments, the dimple is located proximate a tip of the airfoil.

In some embodiments, the ice-accruing feature is a bump or a dimple defined in a surface of a nose cone of the fan or on a surface of a platform of one of the fan blades.

In some embodiments, the bump or the dimple is located circumferentially between two adjacent ones of the fan blades.

In some embodiments, the ice-accruing feature includes a plurality of ice-accruing features each located on a respective one of fan blades of a subset of the fan blades, the fan blades of the subset of the fan blades distributed non-axisymmetrically around the rotation axis.

In another aspect, there is provided a fan icing detection system, comprising: a fan having an ice-accruing feature exposed to an air flow flowing through the fan such that the fan is rotationally imbalanced when ice accrues on the fan; a sensor operatively coupled to the fan for detecting vibrations of the fan; and a controller having a processing unit and a computer readable medium operatively connected to the processing unit and containing instructions executable by the processing unit for: receiving a signal from the sensor, the signal indicative of an imbalance of the fan caused by the ice-accruing feature; and displaying an indicator on a cocking of an aircraft, the indicator indicative of ice accumulation on the fan, and/or increasing a rotational speed of the fan to shed ice accumulated on the fan.

The fan icing detection system may include any of the following features, in any combinations.

In some embodiments, the controller further contains instructions for: determining that the ice on the fan has been shed; and decreasing the rotational speed of the fan.

In some embodiments, the controller further contains instructions for receiving a signal from the sensor, the signal indicative that the fan is rotationally balanced.

In some embodiments, the ice-accruing feature is a tab secured to at least one fan blade of fan blades of the fan and/or to a nose cone of the fan or wherein the ice-accruing feature is a dimple defined by the at least one fan blade and/or defined by a nose cone of the fan.

In yet another aspect, there is provided a method of operating a fan of a turbofan engine, the fan having fan blades, the method comprising: rotating the fan about a rotation axis; detecting a rotational imbalance of the fan caused by ice accruing non-axisymmetrically on the fan because of an ice-accruing feature located on a surface of the fan exposed to an air flow flowing between the fan blades; and shedding the ice.

The method described above may include any of the following features, in any combinations.

In some embodiments, the detecting of the rotational imbalance includes receiving a signal from a vibration sensor operatively connected to the fan.

In some embodiments, a signal is sent to a cockpit of an aircraft when the rotational imbalance is detected and/or automatically initiating the shedding of the ice.

In some embodiments, the detecting of the rotational imbalance includes detecting the rotational imbalance caused by at least one of the fan blades having the ice-accruing feature causing a difference in ice accumulation between the at least one of the fan blades and a remainder of the fan blades.

In some embodiments, the detecting of the rotational imbalance includes detecting the rotational imbalance caused by the ice-accruing feature located on a nose cone of the fan, the ice-accruing feature causing a difference in ice accumulation between a circumferential location corresponding to the ice-accruing feature and a remainder of the nose cone.

In some embodiments, the detecting of the rotational imbalance caused by the ice-accruing feature includes detecting the rotational imbalance caused by a dimple or a bump located on the nose cone at the circumferential location.

DESCRIPTION OF THE DRAWINGS

Reference is now made to the accompanying figures in which.

DETAILED DESCRIPTION

Figure 1:
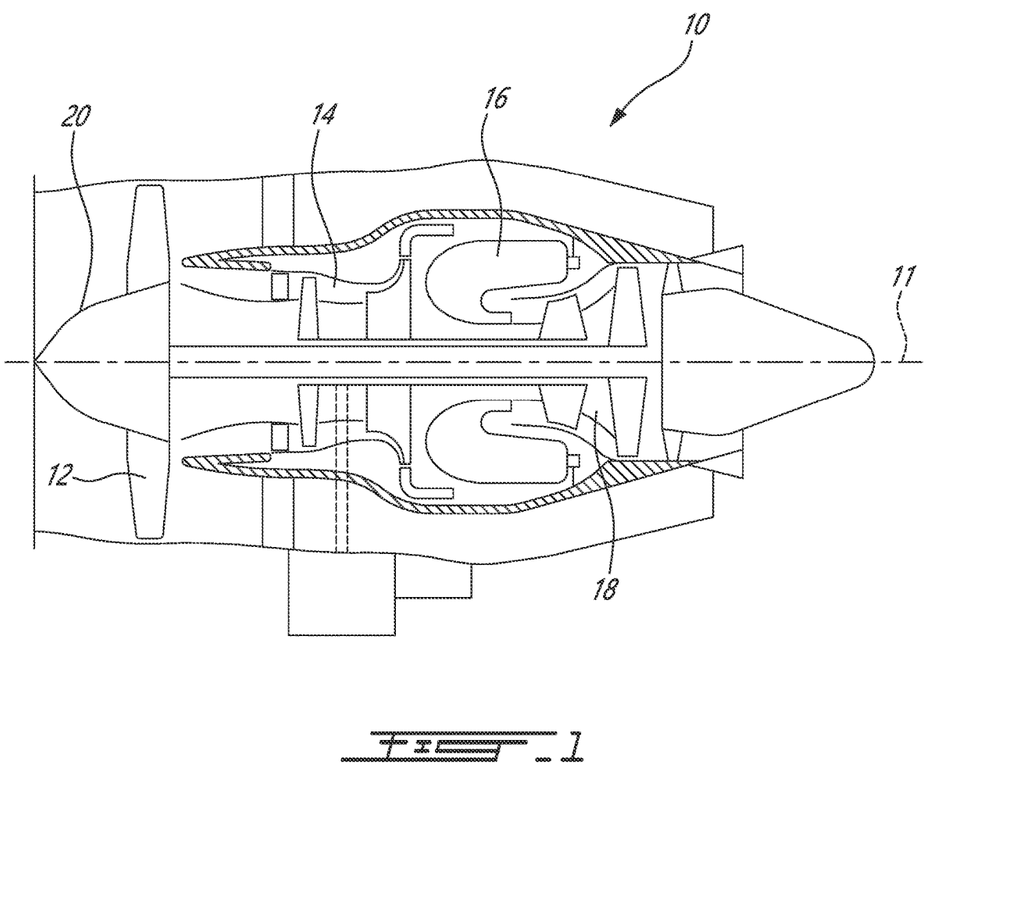
FIG. 1 is a schematic cross sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10. It will be appreciated that the turbofan engine need not be a gas turbine engine and that any suitable engine, such as a reciprocating engine, a rotary engine, an electric motor, a hybrid engine and so on may be used to drive the fan 12.

Figure 2:
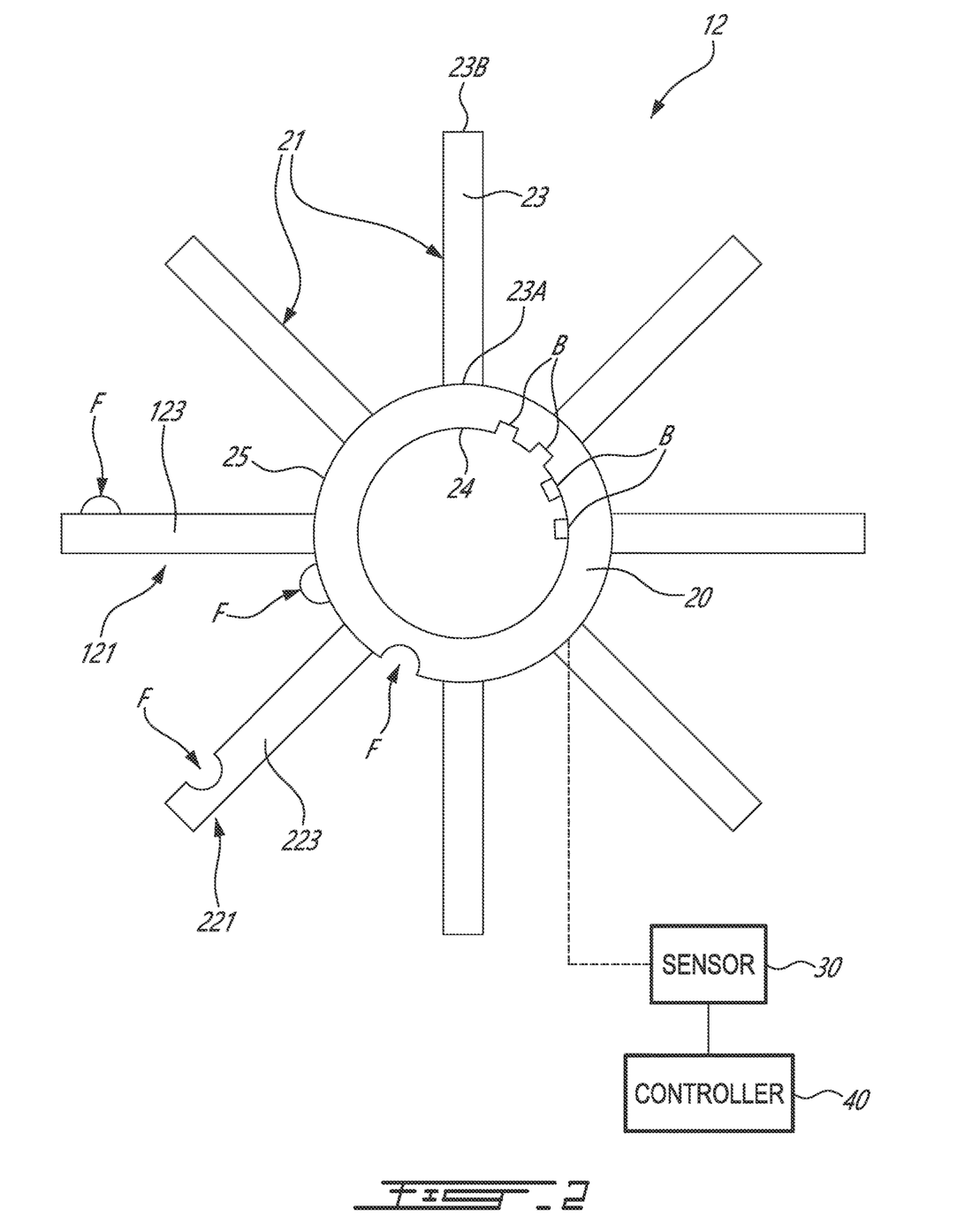
FIG. 2 is a schematic front view of a fan of the gas turbine engine of FIG. 1.
Figure 3:
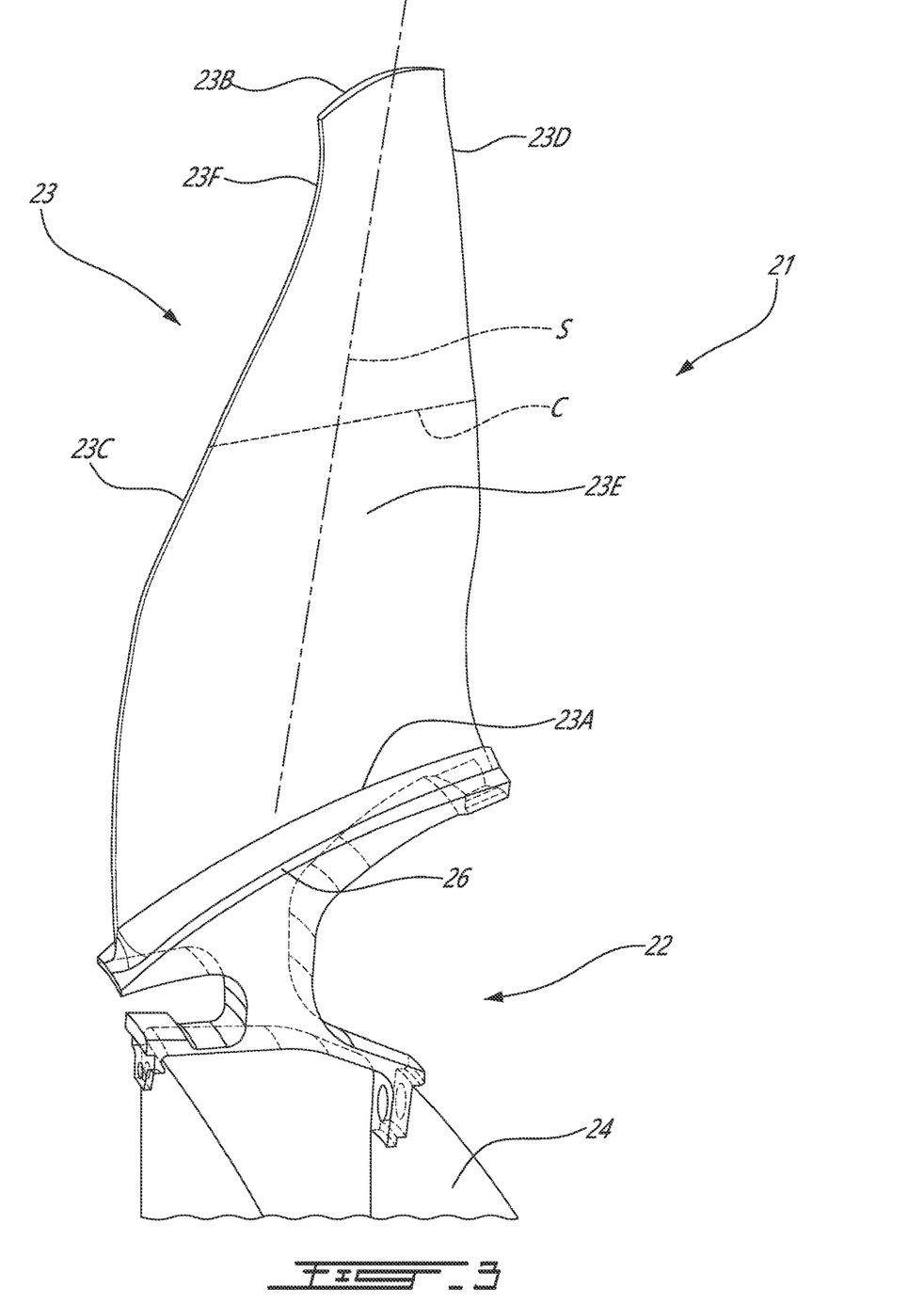
FIG. 3 is a three dimensional view of a blade of the fan of FIG. 2 in accordance with one embodiment.

Referring to FIG. 2-3, the fan 12 is described in more detail with reference numerals in the 20's. The fan 12 includes a central section 20 and blades 21 circumferentially distributed about the central axis 11. The blades 21 include bases 22 and airfoils 23 protruding radially outwardly from the bases 22 relative to the central axis 11 and from roots 23A to tips 23B located radially outwardly from the roots 23A. The airfoils 23 extend along spans S from the roots 23A to the tips 23B and extend along chords C from leading edges 23C to trailing edges 23D. The airfoils 23 have pressure sides 23E and opposed suction sides 23F.

The central section 20 of the fan 12 includes a hub 24 and a nose cone 25 located radially outwardly of the hub 24. The nose cone 25 may be secured to the hub 24. The bases 22 of the blades 21 are secured to the hub 24 and the nose cone 25 is flush with platforms 26 of the bases 22. Hence, a substantially smooth and continuous aerodynamic surface is defined by the nose cone 25 and the platforms 26 of the bases 22 of the blades 21. The nose cone 25, the platforms 26, and the airfoils 23 may therefore be exposed to an air flow flowing through the fan 12 between the blades 21. In some embodiments, the platforms 26 may be covered by the nose cone 25.

In use, when the gas turbine engine 10 is operated in icing conditions, a layer of ice may accrue on the nose cone 20, on the airfoils 23 of the blades 21, and/or on the platforms 26 of the blades 21. Typically, the layer of ice accrues axisymmetrically such that there may be no indications to pilots of an aircraft equipped with the gas turbine engine 10 that ice is being accumulated. Indeed, if ice accrues axisymmetrically, there may be no rotational imbalance on the fan 12 due to the ice. When the aircraft is landing, a rotational speed of the fan 12 decreases which contributes in maintaining the layer of ice on the fan 12. When the gas turbine engine 10 is re-started, for instance, for a subsequent file, the rotational speed of the fan 12 increases up to a point where centrifugal forces are strong enough to shed the layer of ice away from the fan 12. Moreover, it is possible that while the engine is shut down, if the ice remained on the fan blades during the previous shutdown, the ice may melt and refreeze, which may cause a large imbalance on the subsequent start. This sudden shedding of the ice may create loud noises in the cabin and may be detrimental to the gas turbine engine 10 by affecting downstream components. Moreover, fan ice buildup or accretion and shedding of said ice is becoming an increasing problem with recent turbofan engines as fan blade design evolves to increase efficiency and reduce noise but also increases surface area, which may result in more/faster ice accretion.

Referring to FIG. 2, in the embodiment shown, one the blades 21, which will be referred to below as an ice-detecting blade 121, has an ice-accruing feature F located on a respective one of the airfoils, which will be referred to as an ice-detecting airfoil 123. The ice-accruing feature F is exposed to an air flow flowing through the fan 12. The ice-accruing feature F is designed to change a surface area of the ice-detecting airfoil 123 such that the ice-detecting airfoil 123 has a different area exposed to the air flow than the airfoils 23 of a remainder of the blades 21.

The ice-accruing feature F creates a rotational imbalance in the fan 12 when no ice is present on the fan 12. This rotational imbalance may be counter acted by a balancing feature B. The balancing feature B may include one or more elements secured to the fan 12 and being not exposed to the air flow. The balancing feature B may be located at a diametrically opposed location from the ice-accruing blade 121 to balance the ice-accruing feature F such that the fan 12 is rotationally balanced when rotating and when no ice is present. The balancing feature B may be one or more trim weights tailored to balance out the ice-accruing feature.

In other words, if the ice-accruing feature F corresponds to added weight on the ice-accruing airfoil 123, the balancing feature B may correspond to added weight on the nose cone 20 at a location diametrically opposed to the ice-accruing airfoil 123. The balancing feature B may be secured to a shaft drivingly engaging the fan 12. If the ice-accruing feature F corresponds to removed weight, weight may be removed from the nose cone 20 at a diametrically opposed location so that the fan 12 is balanced when no ice is present. Any suitable ways of balancing the fan 12 are contemplated without departing from the scope of the present disclosure. It will be appreciated that a weight of the balancing feature B does not necessarily correspond to a weight of the ice-accruing feature F because they may not be located at the same radial distance from the central axis 11. Known methods may be used to balance the fan 12 with one or more blade having an ice-accruing feature F.

In use, when the gas turbine engine 10 is operated in icing condition, the ice accrues on the nose cone 20 and on the airfoils 23, but the layer of ice may be non-axisymmetric thanks to the ice-accruing feature F. Hence, for instance, more ice may accumulate on the ice-accruing airfoil 123 compared to a remainder of the airfoils 23. This non-axisymmetry in the ice accumulation caused by the ice-accruing feature F may cause a rotational imbalance in the fan 12 such that vibrations may be induced by the non-axisymmetric layer of ice on the fan 12. In other words, when the fan blades start accumulating ice, the ice-accruing feature F may also accumulate ice and create an imbalance proportional to the amount of ice accumulated.

A sensor 30 is operatively connected to the fan 12. The sensor 30 may be secured to an outer flange, which may be non rotating of the engine and may detect radial imbalances in the case of this vibration sensor. The controller 40 may be able to detect the vibrations of the fan blade 12 by tracking the specific vibration levels that align to the known shaft speed (e.g., 1/per revolution) and location on the fan relative to a missing tooth in the phonic wheel. The sensor 30 may be a vibration sensor and may be operable to detect amplitude and/or frequency of vibrations of the fan 12. The sensor 30 may be operatively connected to the fan 12 or, alternatively, operatively connected to a low-pressure shaft of the gas turbine engine 10 that drivingly engages a power turbine of the turbine section 18 to the fan 12. The sensor 30 may be operatively connected to an aircraft controller 40, which may be any controller associated with the aircraft, such as an engine controller, and that is operable to receive the signal from the sensor 30. The signal is indicative of an imbalance of the fan 12 being caused by the ice-accruing blade 121. Since a circumferential position of the ice-accruing blade 121 is known, the controller 40 may be able to interpret the signal from the sensor 30 to determine that the perceived vibrations are caused by the ice-accruing blade 121. This indicates to the controller 40 that ice is being accumulated on the fan 12. It is noted that knowing the location of the ice-accruing blade 121 may improve the sensitivity of the detection of the ice, but the system may still be able to detect ice accumulation without knowledge of the location of the ice-accruing blade since the imbalance may start when icing conditions are present and would continue to increase as the ice accrues on the blades.

At which point, a warning signal may be sent to a cockpit of the aircraft so that the pilots may be notified of the presence of ice on the fan 12. The pilots may therefore initiate an ice-shedding procedure, which may include, for instance, increasing a rotational speed of the fan 12 up to a point where the centrifugal forces are strong enough to shed the ice away from the fan 12. In some other cases, the controller 40 may automatically initiate the ice-shedding procedure. To maintain a thrust to the aircraft constant, the controller 40 may increase the rotational speed of one of a plurality of engines of the aircraft while decreasing the rotational speed of a remainder of the engine(s). The controller 40 may serially perform the ice-shedding procedures to each of the engines, one after the other, until no ice is present. The sensor 30 may, after the ice-shedding procedure, detect that no vibrations are being induced by the ice-accruing blade 121 and normal operation of the engine may be resumed.

More than one airfoils 23 and/or more than one locations on the nose cone 25 of the nose cone 20 or platforms 26 of the blades 21 may be provided with an ice-accruing feature F as long as the one or more ice-accruing feature(s) F render the fan 12 non-axisymmetric. The plurality of ice-accruing feature may therefore be distributed non-axisymmetrically around the central axis 11. To counter-act a rotational imbalance generated by the one or more ice-accruing feature(s) F, the fan 12 includes one or more balancing features B. Each of the one or more ice-accruing features may be associated with a corresponding balancing feature B such that when no ice is present on the fan 12, the fan 12 is rotationally balanced. In some cases, a single balancing feature B may be used to balance out the plurality of ice-accruing features F without departing from the scope of the present disclosure.

Figure 4A:
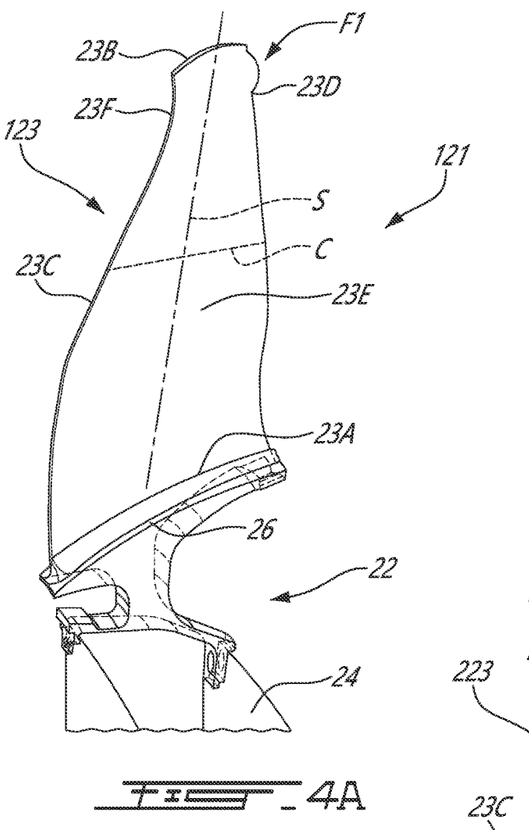
FIG. 4A is a three dimensional view of a blade of the fan of FIG. 2, the blade having an ice-accruing feature in accordance with one embodiment.

Referring to FIG. 4A, in the embodiment shown, the ice-accruing feature is a tab F1 secured to the ice-accruing airfoil 123. The tab F1 may be secured to the trailing edge 23D of the airfoil 123 and may protrude in a downstream direction from the trailing edge 23D relative to the air flow flowing through the fan 12. The tab F1 may be secured proximate the tip 23B of the airfoil 123. This may allow to use a smaller tab than if it were secured proximate the root 23A of the airfoil 123. The tab F1 may be secured to the pressure side 23E and/or suction side 23F of the airfoil 123. The tab F1 may have any suitable shape selected to minimize impact on aerodynamic performance of the fan 12. In this case, the balancing feature B may correspond to added weight in the nose cone 20 to balance out the rotational imbalance created by the tab F1.

Figure 4B:
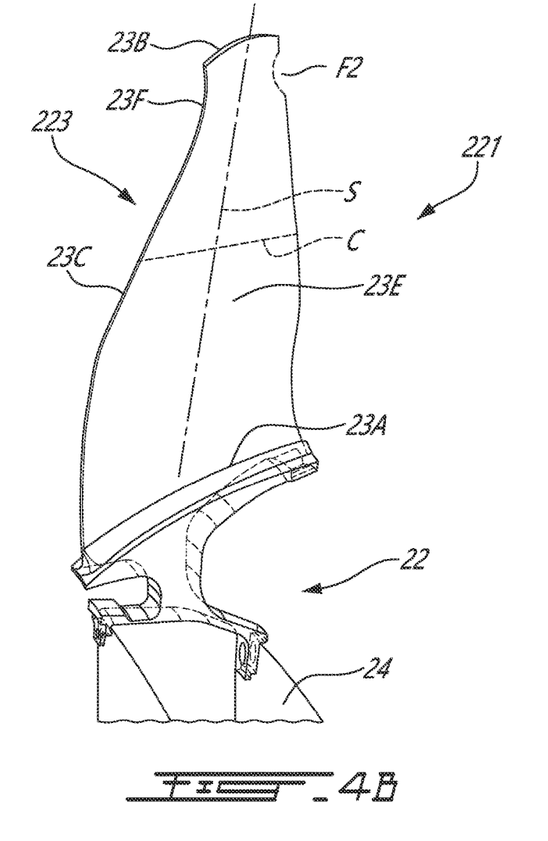
FIG. 4B is a three dimensional view of a blade of the fan of FIG. 2, the blade having an ice-accruing feature in accordance with another embodiment.

Referring now to FIG. 4B, in the embodiment shown, the ice-accruing feature is a dimple F2 defined by the ice-accruing airfoil 223. The dimple F2 may be located on the trailing edge 23D of the airfoil 223. The dimple F2 may be a trailing edge cut-out. The dimple F2 may be located proximate the tip 23B of the airfoil 223. The dimple F2 may be located on the pressure side 23E and/or suction side 23F of the airfoil 223. The dimple F2 may have any suitable shape selected to minimize impact on aerodynamic performance of the fan 12. In this case, the balancing feature B may correspond to removed weight in the nose cone 20 to balance out the rotational imbalance created by the dimple F2.

The ice-accruing feature may include one or more grooves, one or more scallops, one or more fins, one or more bumps, one or more dimples, one or more vortex generators, saw teeth, and so on. The ice-accruing feature may be located at any suitable location on the fan 12 as long as it is exposed to the air flow and ice accretion. The ice-accruing feature may be located, for instance, on the airfoil, on the platform, on the nose cone, and so on. Any feature that would allow ice to accrue differently on the ice-accruing blade compared to the other blades may be used without departing from the scope of the present disclosure. A single blade may be equipped with more than one ice-accruing feature as need. More than one blade may include one or more ice-accruing feature each as long as the fan 12 is rotationally imbalanced when ice accrues on the fan 12. The ice-accruing feature may be a monolithic part of the blade or nose cone.

The ice-accruing feature may be located on one or more of the fan blades 21 and/or at one or more locations on a surface of the nose cone 20 or blade platforms 26 exposed to an air flow flowing through the fan 12. The ice-accruing feature F may locally break an axisymmetry of the nose cone 25 of the nose cone 20 such that a surface of the nose cone 20 exposed to the air flow is axisymmetric but for at the ice-accruing feature F.

The disclosed fan 12 may provide pilots with a positive indication that ice shedding procedure should be followed. This may work both in flight and ground operation. It may allow sooner detection results in following ice shedding procedure sooner. This may result in less ice accumulation and shedding of less material thereby reducing shock/damage to fan, fan shroud and downstream parts. Lower engine vibration and lower noise levels may be achieved when shedding of smaller quantities if ice. Ice shedding procedure may be automated. At lower speed of the fan 12, such as during approach and taxiing when higher ice loads can accumulate due to lower centrifugal force before ice shedding occurs, pilots may have positive confirmation of ice buildup and may know if ice shedding procedure is required during taxi, before engine shutdown or immediately after starting the engine. The disclosed fan 12 may allow to detect ice and may use existing engine vibration monitoring systems. It may be simple and may offer less weight penalties of a fan blade heating system and may be more efficient than blade coatings that require frequent cleaning and recoating.

Figure 5:
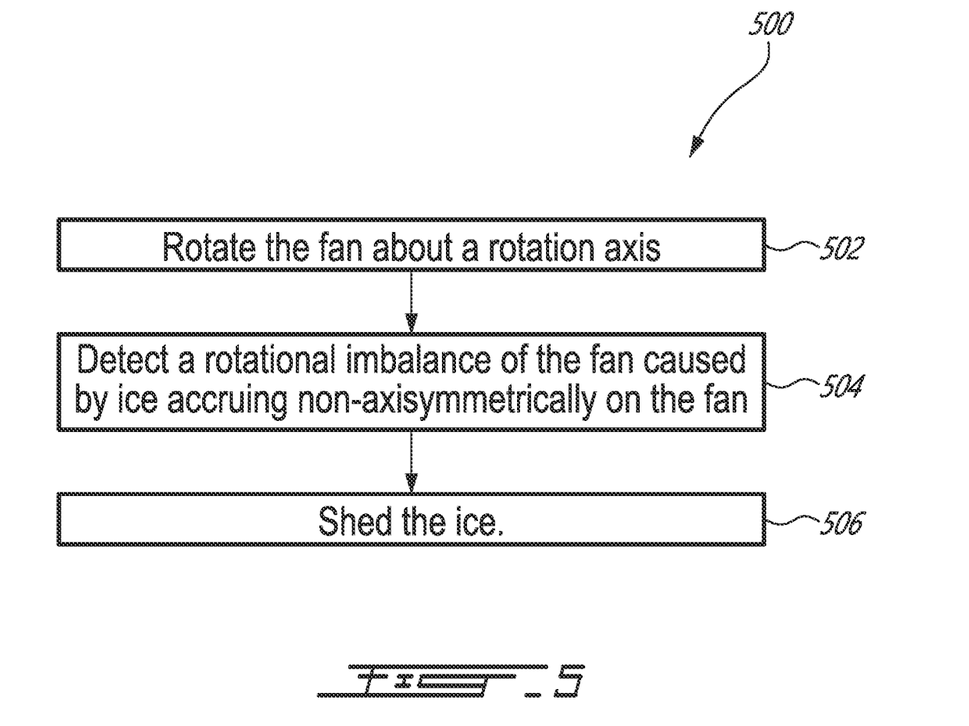
FIG. 5 is a flow chart illustrating a method of detecting ice accumulation on a fan.

Referring now to FIG. 5, a method of detecting ice on the fan 12 is shown at 500. The method 500 includes rotating the fan 12 about the central axis 11 at 502; detecting a rotational imbalance of the fan 12 caused by the ice accruing non-axisymmetrically on the fan 12 at 504; and shedding the ice at 506.

In the embodiment shown, the detecting of the rotational imbalance includes receiving a signal from the sensor 30 operatively connected to the fan 12. The signal may be sent to a cockpit of an aircraft when the rotational imbalance is detected and/or the shedding of the ice may be automatically initiated. The detecting of the rotational imbalance at 504 may include detecting the rotational imbalance caused by at least one of the fan blades 121, 221 having an ice-accruing feature F, F1, F2 causing a difference in ice accumulation between the at least one of the fan blades 121, 221 and a remainder of the fan blades 21. The detecting of the rotational imbalance at 504 may include detecting the rotational imbalance caused by an ice-accruing feature located on the nose cone 20, the ice-accruing feature causing a difference in ice accumulation between a circumferential location corresponding to the ice-accruing feature and a remainder of the nose cone 20. The detecting of the rotational imbalance caused by the ice-accruing feature F, F1, F2 may include detecting the rotational imbalance caused by a dimple or a bump located on the nose cone 20 at the circumferential location.

The disclosed system may notify the pilot early that ice is accruing. Then, ice shedding maneuvers such as temporarily increasing fan speed, may be used sooner to shed the ice before the ice accumulation reaches levels that may result in reduced fan imbalance, orbiting, vibration and impact from ice particles which may cause foreign object damage.

Figure 6:
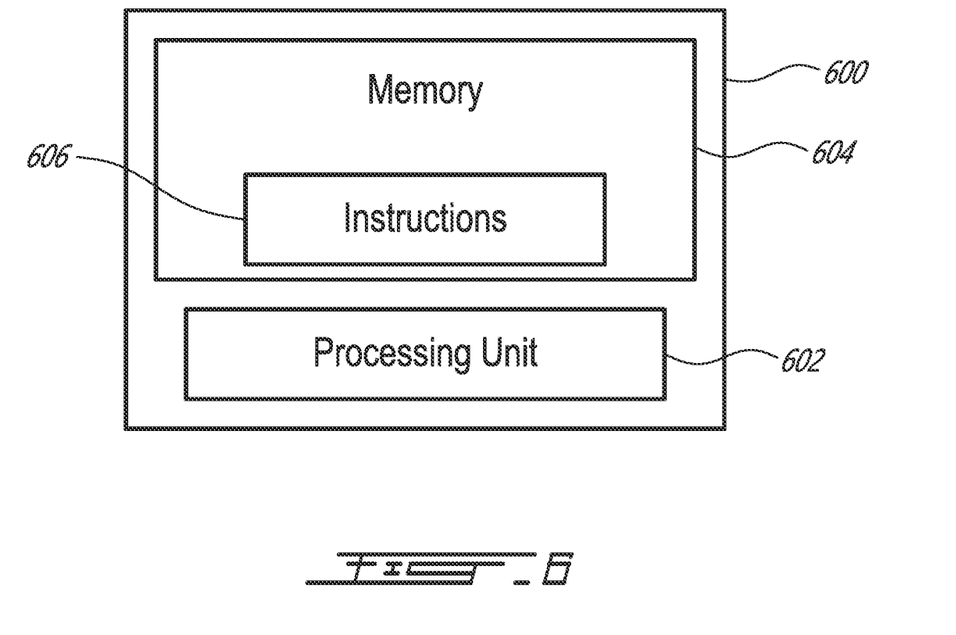
FIG. 6 is a schematic view of a computing device in accordance with one embodiment.

With reference to FIG. 6, an example of a computing device 600 is illustrated. For simplicity only one computing device 600 is shown but the system may include more computing devices 600 operable to exchange data. The computing devices 600 may be the same or different types of devices. The controller 40 may be implemented with one or more computing devices 600. Note that the controller 40 can be implemented as part of a full-authority digital engine controls (FADEC) or other similar device, including electronic engine control (EEC), engine control unit (ECU), electronic propeller control, propeller control unit, and the like. In some embodiments, the controller 40 is implemented as a Flight Data Acquisition Storage and Transmission system, such as a FAST™ system. The controller 40 may be implemented in part in the FAST™ system and in part in the EEC. Other embodiments may also apply.

The computing device 600 comprises a processing unit 602 and a memory 604 which has stored therein computer-executable instructions 606. The processing unit 602 may comprise any suitable devices configured to implement the method 500 such that instructions 606, when executed by the computing device 600 or other programmable apparatus, may cause the functions/acts/steps performed as part of the method 500 as described herein to be executed. The processing unit 602 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 604 may comprise any suitable known or other machine-readable storage medium. The memory 604 may comprise non-transitory computer readable storage medium, for example, but not limited to, an electronic, magnetic, optical, electromagnetic, infrared, or semiconductor system, apparatus, or device, or any suitable combination of the foregoing. The memory 604 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 604 may comprise any storage means (e.g., devices) suitable for retrievably storing machine-readable instructions 606 executable by processing unit 602.

The methods and systems for detecting ice accumulation described herein may be implemented in a high level procedural or object oriented programming or scripting language, or a combination thereof, to communicate with or assist in the operation of a computer system, for example the computing device 600. Alternatively, the methods and systems for detecting ice accumulation may be implemented in assembly or machine language. The language may be a compiled or interpreted language. Program code for implementing the methods and systems for detecting ice accumulation may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for detecting ice accumulation may also be considered to be implemented by way of a non-transitory computer-readable storage medium having a computer program stored thereon. The computer program may comprise computer-readable instructions which cause a computer, or more specifically the processing unit 602 of the computing device 600, to operate in a specific and predefined manner to perform the functions described herein, for example those described in the method 500.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A turbofan engine comprising a fan drivingly engaged by a shaft for rotation about a rotation axis and having:
   fan blades circumferentially distributed about the rotation axis and drivingly engaged by the shaft;
   at least one ice-accruing feature located on a surface of the fan exposed to an air flow flowing between the fan blades, the surface of the fan exposed to the air flow being axisymmetric relative to the rotation axis but for the at least one ice-accruing feature;
   a balancing feature secured to the fan or to the shaft to counteract the at least one ice-accruing feature such that an assembly of the fan and the shaft is rotationally balanced when the fan is free of ice, the balancing feature being radially offset from the rotation axis;
   a controller having a processing unit and a computer readable medium operatively connected to the processing unit and containing instructions executable by the processing unit; and
   a sensor operatively connected to the fan and operable to send a signal to the controller, wherein the instructions are configured to interpret the signal to determine when a rotational imbalance of the fan caused by ice accumulation on the at least one ice-accruing feature is present.

2. The turbofan engine of claim 1, wherein the at least one ice-accruing feature includes a tab secured to an airfoil of a fan blade of the fan blades.

3. The turbofan engine of claim 2, wherein the tab is protruding from a trailing edge of the airfoil.

4. The turbofan engine of claim 3, wherein the tab is located proximate a tip of the airfoil.

5. The turbofan engine of claim 1, wherein the at least one ice-accruing feature includes a dimple defined by an airfoil of a fan blade of the fan blades.

6. The turbofan engine of claim 5, wherein the dimple is located at or proximate to a trailing edge of the airfoil.

7. The turbofan engine of claim 6, wherein the dimple is located proximate a tip of the airfoil.

8. The turbofan engine of claim 1, wherein the at least one ice-accruing feature is a bump or a dimple defined in a surface of a nose cone of the fan or on a surface of a platform of one of the fan blades.

9. The turbofan engine of claim 8, wherein the bump or the dimple is located circumferentially between two adjacent ones of the fan blades.

10. The turbofan engine of claim 1, wherein the at least one ice-accruing feature includes a plurality of ice-accruing features each located on respective ones of fan blades of a subset of the fan blades, the fan blades of the subset of the fan blades distributed non-axisymmetrically around the rotation axis.

11. The turbofan engine of claim 1,
    wherein the instructions are further configured for:
    sending a signal to an aircraft, the signal indicative of the ice accumulation on the fan, and/or
    increasing a rotational speed of the fan to shed ice accumulated on the fan.

12. The turbofan engine of claim 11, wherein the instructions are further configured for:
    determining that the ice accumulation on the fan has been shed; and
    decreasing the rotational speed of the fan.

13. The turbofan engine of claim 12, wherein the instructions are further configured to interpret the signal to determine when the fan is rotationally balanced.

14. The turbofan engine of claim 11, wherein the at least one ice-accruing feature is a tab secured to at least one fan blade of the fan blades of the fan.

15. The turbofan engine of claim 11, wherein the at least one ice-accruing feature is a tab secured to a nose cone of the fan.

16. The turbofan engine of claim 11, wherein the at least one ice-accruing feature is a dimple defined by at least one fan blade of the fan blades and/or defined by a nose cone of the fan.

\* \* \* \* \*